United States Patent Office 3,374,734
Patented Mar. 26, 1968

3,374,734
METHODS FOR PROVIDING PLANOGRAPHIC PRINTING PLATES WITH IMAGE AREAS CONTAINING CHLORINATED RUBBER
Loni Schell, Mainz, and Fritz Uhlig and Jürgen Braun, Wiesbaden-Biebrich, Germany, assignors, by mesne assignments, to Azoplate Corporation, Murray Hill, N.J.
No Drawing. Filed Aug. 20, 1964, Ser. No. 391,042
Claims priority, application Germany, Aug. 23, 1963, K 50,618/63
7 Claims. (Cl. 101—466)

Litho plates are produced by providing a suitable support with a thin, light-sensitive reproduction coating. By imagewise exposure with a suitable light source, a differentiation of the solubility of the reproduction coating is effected in such a way that the areas affected by light become either soluble or insoluble in comparison with the areas not affected by light. The soluble parts of the reproduction coating are then removed with suitable solvents, and the image thus obtained, which has oleophilic properties, is inked up with greasy ink and used for printing. The non-image areas have hydrophilic properties and repel the greasy ink.

This method for the preparation of litho plates has several disadvantages which decrease their quality and complicate the use thereof because the oleophilic image areas are very thin and therefore susceptible to mechanical damage. The runs obtained from such plates are therefore only moderately long.

Attempts have been made to overcome the aforementioned disadvantages of litho plates by treating the developed image before the inking up process with lacquer emulsions which contain a thickening agent in their aqueous phase and vinyl chloride copolymers in their organic phase. According to another proposal epoxy compounds are used in the organic phase. These known lacquer emulsions have the disadvantage that they are not sufficiently adhesive and are too brittle, i.e., their film-forming properties are not satisfactory. The water contained in known lacquer emulsions dissolves the reproduction coating only slightly and the resins contained in the organic phase of the lacquer emulsions are deposited unevenly on the coating.

The lacquer emulsions have the additional disadvantage that they frequently separate into their aqueous and non-aqueous phases if stored under changing climatic conditions and that the dyes or the synthetic resins contained in the emulsions have the tendency to form a deposit on the bottom of the container. Furthermore, only the smaller printing plates can be lacquered in a streak-free manner with these emulsions.

Printing plates for large offset printing are normally provided with lacquers containing only organic solvents. The known solvent lacquers do not, however, satisfy requirements sufficiently because they do not adhere firmly enough to the printing plate and because they are too brittle, i.e., their film-forming properties are not satisfactory. The runs obtained from such plates are therefore not as long as desired. Furthermore, the known lacquers are not resistant to chemicals on the printing plates; they are in particular attacked by alkaline and acid aqueous solutions.

Lacquers for printing plates also are known which contain organic solvents and, as the lacquer base, vinyl chloride copolymers containing carboxyl groups. The practical use of these lacquers is, however, limited. Thus, they are, for example, not sufficiently resistant to alkaline solutions and to the paper to be printed, which sometimes reacts weakly alkaline, because the lacquers contain free carboxyl groups.

A lacquer for the after-treatment of developed printing plates has now been found, which comprises at least one organic solvent, at least one chlorinated rubber, preferably one or more dyes and, if desired, one or more plasticizers or film-forming agents.

Chlorinated rubber may be prepared by chlorinating rubber, commercially available products generally have a resinous character and contain between 62–66 percent by weight of chlorine. Apart from these highly chlorinated products, which are preferred for the lacquers of the present invention, chlorinated rubbers with a lower chlorine content, for example between 30 and 60 percent, are also suitable.

The lacquer contains at least one organic solvent. The following substances are, for example, suitable: aliphatic and cyclo-aliphatic ketones, preferably ketones having up to 10 carbon atoms, such as methylisobutylketone, methylethylketone, methylpropylketone, diisobutylketone, methylamylketone, ethylamylketone, and cyclohexanone; esters of aliphatic carboxylic acids with aliphatic alcohols or diols, for example butyl acetate, amyl acetate, methylglycol acetate, ethylglycol acetate, ethyleneglycol diacetate and ethyleneglycol monoacetate; also partly hydrogenated aromatic hydrocarbons, such as tetrahydronaphthalene and dipentene; aromatic hydrocarbons, such as toluene, xylene and mesitylene; and hydrated hydrocarbons, such as menthane and paraffin oil.

The lacquer contains one or several chlorinated rubber resins, dissolved in one or more of the aforementioned solvents, preferably in a concentration of 1.0–15.0, and in particular 5.0–10.0 percent by weight. Furthermore, the lacquer of the present invention contains at least one dyestuff which is soluble in organic solvents. The following dyes are, for example, suitable: Pigmentrot B (60), Rhodamine B (864), Fettscharlach G (153), Litholrubin (194), Fettrot HRR, Reinblau (816), Fettrot A (864), Echtscharlach (448), Sudanblau (816). The numbers after the names of the dyes are taken from: Schultz, "Farbstofftabellen," 7th edition, volume 1. Fettrot HRR is an azo dye of the formula $C_{22}H_{16}N_4O$, prepared by coupling 1 mole of diazotized p-aminoazobenzene with 1 mole of β-naphthol.

The amount of dyestuff generally is in the range of 0.1 and 5.0 percent by weight in relation to the chlorinated rubber.

One or several plasticizers or film-forming agents may also be added to the lacquer, thus increasing its film-forming properties. For instance, unsaponifiable plasticizers are suitable, such as chlorinated paraffin, chlorodiphenyl, sulfur-containing hydrocarbons, polyvinylmethylether, aldehyde, ketone and/or coumarone resins.

The lacquer of the present invention may be used according to several methods, for example according to methods (a), (b) and (c) described below.

(a) A plate having a light-sensitive coating and a base which preferably consists of aluminum or zinc, is exposed under an original and treated with a suitable, e.g. weakly alkaline, developing liquid, for example a dilute trisodium phosphate solution, thereby removing the non-image areas which may be either the exposed or the unexposed areas of the coating, depending upon the light-sensitive substance used. Excess developer is wiped off or removed by rinsing with water and the image areas are inked up with greasy ink. The non-image areas do not accept ink. The entire image area of the printing plate is then wiped over with a dilute aqueous solution of a water-soluble colloid as used for preserving printing plates, for example gum arabic, carboxymethyl cellulose or alginic acid. The lacquer of the present invention is poured onto the printing plate, which is still damp from the preserving solution or which has been previously dried, and is then distributed over the entire plate by mean of a pad of cotton or a cellulose or polyurethane sponge. The lacquer dissolves the ink and the chlorinated rubber which is contained in the lacquer and which is preferably colored, adheres extremely firmly to the support in the image areas, whereas there is no particular adhesion in the gummed non-image areas. The plate is then dried at room temperature or with heat, for example with a hot air stream or in a drying cupboard, following which it is sprayed with a strong jet of water. This removes the lacquer in large sheets from the non-image areas, whereas it remains firmly attached to the image areas. Thus, a strongly colored image is obtained on the printing plate. It can be used in the normal manner in a printing machine, and a long run of prints is obtained therefrom.

(b) A plate coated with a light-sesitive substance and having a base preferably of aluminum or zinc, is exposed under an original and is then treated with a suitable developing liquid, for example a weakly alkaline developer, thereby removing the exposed areas of the coating. The excess developer is wiped off and the plate is dried. The plate is exposed for a second time without an original, and then the entire image area of the plate is wiped over with the chlorinated rubber lacquer of the present invention. The lacquered plate is dried for 15 minutes at 50° C. The film of lacquer adheres extremely firmly to the uncovered metal image areas, whereas it forms a porous layer without particular adhesion in the non-image areas. The entire image area of the plate is now inked up with greasy ink and wiped over with the weakly alkaline developing liquid described above. The developing liquid penetrates through the greasy ink and the porous coating of lacquer in the non-image areas and dissolves the light-decomposition product, removing it together with the lacquer and the ink. The lacquer in the image areas is not attacked by the developing liquid and a reversed lacquer image of the original is obtained on the metal support. After rinsing with water, an offset printing plate is obtained which can be used in offset machines for the production of long runs of prints.

(c) The chlorinated rubber lacquer of the present invention is used in the manner of an ink for drawing and intensifying lines, for correction of areas or for additional inscription on the printing plate, by gumming and drying the printing plate which was developed and inked up after exposure under an original. Lines are drawn with a scraper, engraving tool or a needle. The chlorinated rubber lacquer is applied to the thus inscribed surface which is then dried and rinsed with water. Any lacquer adhering accidentally to areas outside the drawing can be removed by slight rubbing. For additional inscription of the printing plate, the area concerned is roughened mechanically with the aid of a glass fibre erasing brush or a similar object, or chemically, and the chlorinated rubber lacquer is applied with a pen, a drawing pen or brush and dried.

For methods (a) and (c) chlorinated rubbers with viscosities above 30 centipoises are preferred and for method (b) chlorinated rubbers with viscosities below 30 centipoises. "Viscosity" in this context is to be understood as meaning the viscosity of a 20% solution of the chlorinated rubber in toluene-butanol 95:5, measured at 20° C. in the Höppler viscometer.

The present invention is further illustrated by the following examples of lacquer compositions. As chlorinated rubber, commercially available products containing between 62 to 66 percent by weight of chlorine have been used.

Example 1

| | Parts by weight |
|---|---|
| Chlorinated rubber | 8.5 |
| Chlorinated paraffin | 0.5 |
| Amyl acetate | 39.5 |
| Methylglycol acetate | 36.0 |
| Cyclohexanone | 15.0 |
| Rhodamine B | 0.5 |

Example 2

| | |
|---|---|
| Chlorinated rubber | 7.0 |
| Dimethylthianthrene | 0.5 |
| Xylene | 62.0 |
| Mesitylene | 25.0 |
| Paraffin oil | 5.0 |
| Fettrot HRR | 0.5 |

Example 3

| | |
|---|---|
| Chlorinated rubber | 5.0 |
| Chlorodiphenyl resin | 0.5 |
| Toluene | 60.0 |
| Cyclohexanone | 10.0 |
| Xylene | 17.0 |
| Paraffin oil | 6.0 |
| Fettrot A | 0.5 |

Example 4

| | |
|---|---|
| Chlorinated rubber | 7.0 |
| Polymethacrylic acid methylester | 0.8 |
| Toluene | 45.0 |
| Xylene | 27.0 |
| Mesitylene | 20.0 |
| Sudanblau | 0.2 |

Example 5

| | |
|---|---|
| Chlorinated rubber (viscosity 35–55 cps.) | 5.8 |
| Chlorinated rubber (viscosity 80–115 cps.) | 5.8 |
| Modified phenol resin and resin acids | 5.0 |
| Xylene | 67.0 |
| Mesitylene | 17.0 |
| Fettrot HRR | 0.4 |

Example 6

| | |
|---|---|
| Chlorinated rubber | 10.0 |
| Amyl acetate | 40.0 |
| Ethylglycol acetate | 40.0 |
| Methylisobutyl ketone | 10.0 |
| Tetrahydronaphthalene | 5.0 |
| Reinblau | 0.5 |

Example 7

| | |
|---|---|
| Chlorinated rubber | 10.0 |
| Ketone-formaldehyde resin | 1.0 |
| Chlorinated paraffin | 1.0 |
| Xylene | 60.0 |
| Cyclohexanone | 10.0 |
| Mesitylene | 30.0 |
| Fettrot HRR | 1.0 |
| Rhodamine B | 0.5 |

It will be obvious to those skilled in the art that many modifications may be made within the scope of the present invention without departing from the spirit thereof, and the invention includes all such modifications.

What is claimed is:

1. A process for forming a printing image on a planographic printing plate which comprises exposing a planographic printing having a light-sensitive coating thereon to light under an original to form image areas, treating the plate with a developing liquid to remove portions of the coating, inking up the plate with a greasy ink, wiping the plate with a solution of a water-soluble colloid, applying a lacquer containing chlorinated rubber in an organic solvent to the image areas, drying the plate and washing the plate with water.

2. A process according to claim 1 in which the lacquer contains a dyestuff.

3. A process according to claim 1 in which the lacquer contains a plasticizer.

4. A process according to claim 1 in which the chlorinated rubber has a chlorine content of 62 to 66 percent by weight.

5. A process according to claim 1 in which the lacquer contains the chlorinated rubber in a concentration of about 1 to 15 percent by weight.

6. A process for forming a printing image on a planographic printing plate which comprises exposing a planographic printing plate having a light-sensitive coating thereon to light under an original to form image areas in the light-exposed portions of the coating, treating the plate with a developing liquid to remove the light-exposed portions of the coating, exposing the plate to light a second time without an original, applying a lacquer containing chlorinated rubber in an organic solvent to the image areas, inking up the plate with a greasy ink, treating the plate with a developing liquid to remove remaining portions of the exposed light-sensitive coating, and rinsing the plate with water.

7. A process for modifying the image areas of an imaged planographic printing plate which comprises inking up the plate with a greasy ink, wiping the plate with a solution of water-soluble colloid, drying the thus-applied colloid coating, scribing through the coating in the areas to be modified, applying a lacquer containing chlorinated rubber in an organic solvent to the scribed surface, drying the plate and rinsing the plate with water.

References Cited

UNITED STATES PATENTS

| | | | |
|---|---|---|---|
| 1,640,961 | 8/1927 | Pinckney | 101—149.2 |
| 1,740,061 | 12/1929 | Beebe et al. | 101—149.2 |
| 1,951,943 | 3/1934 | Mossberg | 101—149.2 |
| 2,198,017 | 4/1940 | Schlesinger | 101—149.2 |
| 2,875,046 | 2/1959 | Marron et al. | 101—149.2 XR |
| 3,185,085 | 5/1965 | Herrick et al. | 101—149.2 |

OTHER REFERENCES

Simond, H. R., et al.: Handbook of Plastics, 2nd ed., N.Y., D. Van Nostrand Co., Inc., 1949, p. 675. TP 986. A2. S48 (1949).

Reed, R.F.: How to Make and Run Deep-Etch Plates, Aluminum, Lithographic Technical Foundation, N.Y., 1954, pp. 62 and 63. NE. 2560. R. 4.

DAVID KLEIN, *Primary Examiner.*